July 24, 1951  W. BENKE  2,561,683
AUTOMATIC GATE

Filed Oct. 14, 1949　　　　　　　　　　　　2 Sheets-Sheet 1

William Benke
INVENTOR

BY *CA Snowles*
ATTORNEYS.

July 24, 1951  W. BENKE  2,561,683
AUTOMATIC GATE
Filed Oct. 14, 1949  2 Sheets-Sheet 2

William Benke
INVENTOR
BY *CA Snow & Geo.*
ATTORNEYS.

Patented July 24, 1951

2,561,683

UNITED STATES PATENT OFFICE 2,561,683

AUTOMATIC GATE

William Benke, San Antonio, Tex., assignor to Carlos W. Bacon, Sr., Bexar County, Tex.

Application October 14, 1949, Serial No. 121,437

1 Claim. (Cl. 39—6)

This invention relates to gate construction, and more particularly automatic gate construction.

The primary object of the invention is to provide a gate having operating means which is in the form of pivoted ramps that engage the vertically swinging gate in such a way that when the wheels of a motor vehicle pass thereonto, the gate will swing downwardly allowing the motor vehicle to pass thereover, means being provided to hold the gate in its open position, while the motor vehicle is passing thereover.

Another object of the invention is to provide means controlled by the weight of the vehicle passing thereover, for releasing the gate to the action of springs, which urge the gate to its upright or closed position.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1:
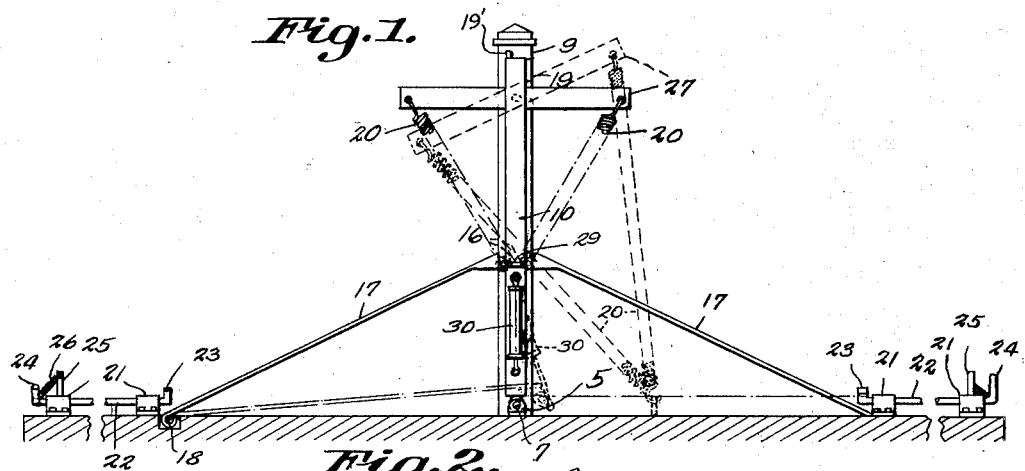
Figure 1 is an end elevational view of a gate constructed in accordance with the invention.
Figure 2:
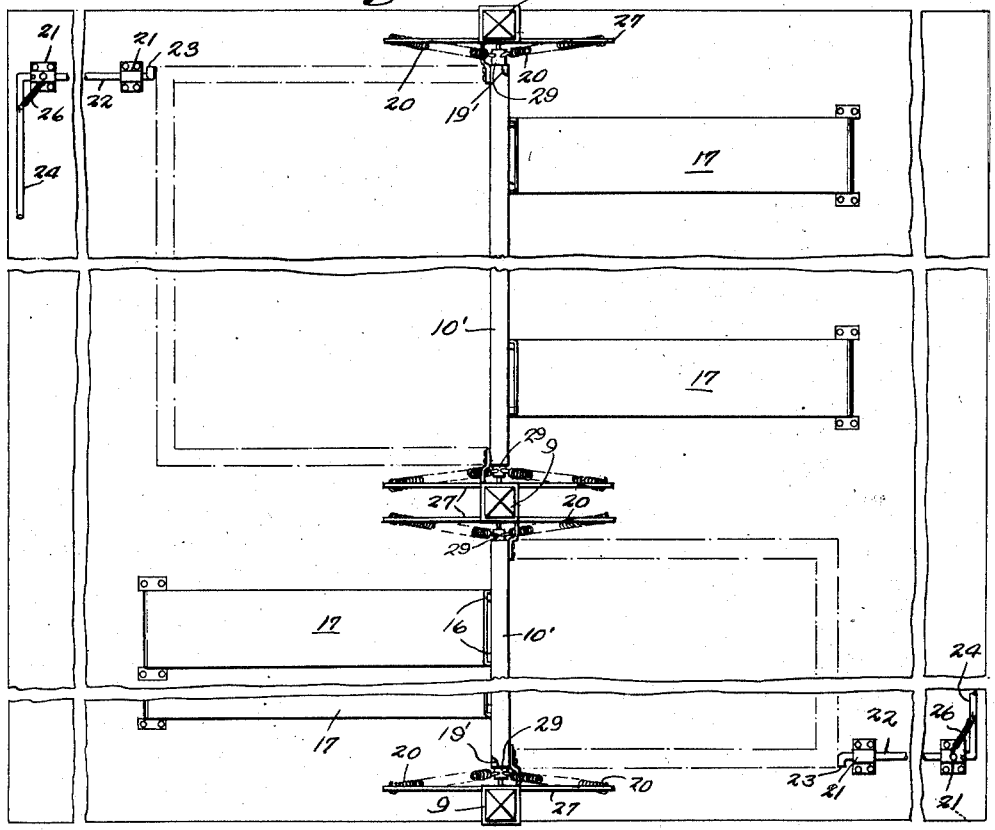
Fig. 2 is a plan view with parts broken away illustrating a pair of gates, one gate for each traffic lane.

Referring to the drawings in detail, the reference character 5 indicates hinges which include brackets 6 which have horizontal bolts 7 extended therethrough, and around which the tubular sections 8 of the hinges, operate.

The reference character 9 indicates gate posts between which the gate proper 10 operates, the gate 10 including upper and lower spaced rails 10' and 11 respectively, the rails being connected at their ends by means of the vertical end bars 12.

Figure 3:
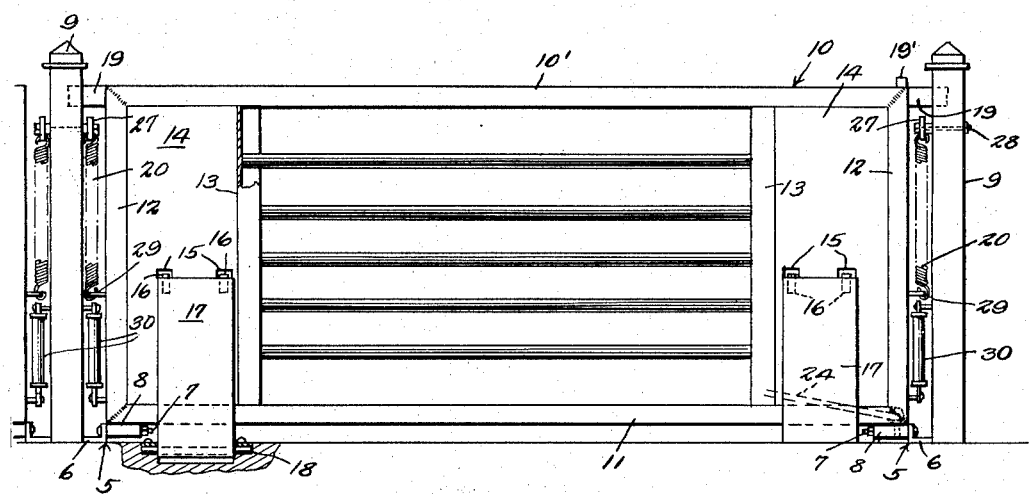
Fig. 3 is an elevational view of a gate, equipped with an operating means constructed in accordance with the invention.

As shown, the gate also includes vertical bars 13 which are spaced from the bars 12, providing frames for the panels 14 which panels are provided with spaced longitudinally disposed grooves 15 that provide tracks for the rollers 16 that are mounted at the outer ends of the pivoted ramps 17. These pivoted ramps are constructed preferably of heavy sheet metal material and have one of their respective ends formed tubular to accommodate the hinge pin 18 associated therewith, the hinge pins 18 being mounted in the foundation of the gate, as shown by Fig. 3 of the drawings.

Arms 19 extend laterally from the upper end of the gate, and provide stops, the arms 19 engaging the gate posts 9 when the gate swings upwardly, holding the gate in an upright position.

Coiled springs 20 are connected with each end of the gate, and these coiled springs are anchored to the gate posts, in such a way that when the gate swings downwardly to its open position, the springs will be placed under tension to return the gate to its normally closed position, after the gate has been released and the motor vehicle has passed the open gate.

The springs 20 have their upper ends connected with the bars 27 that are pivotally connected with the posts 9, by means of the bolts 28, the lower ends of the coiled springs 20 being connected to the gate proper, at the ends of the gate, and at points in spaced relation with respect to the brackets 6, at 29. Thus it will be seen that when the gate swings to its open position, the springs 20 will be placed under tension to return the gate to its normal position after a car has passed thereover.

In order that the movement of the gate to its closed position will be cushioned, tubular shock absorbers 30 are connected between the gate ends and the inner sides of the posts 9, the shock absorbers 30 being of the well known type wherein fluid is forced through an opening of a piston. These shock absorbers will cushion the movements of the gate to its closed position and prevent damage to the gate by sudden jar resulting from the closing of the gate, wherein no shock absorbers are used.

Figures 4, 5:
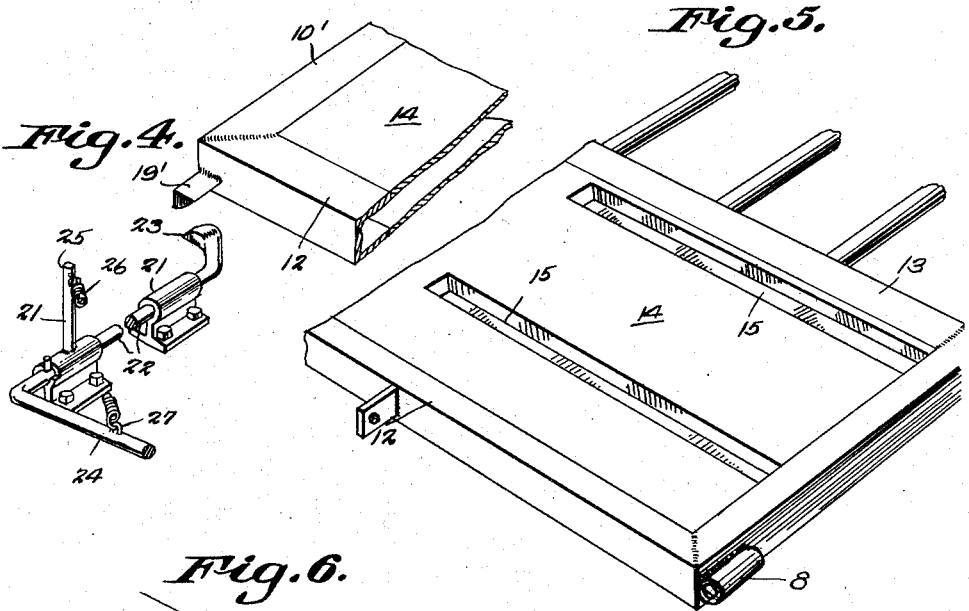
Fig. 4 is a view illustrating the latching means for holding the gate in its open position while a vehicle is passing thereover.
Fig. 5 is a perspective view, illustrating a portion of a panel at one end of a gate, against which a ramp moves in opening the gate.
Figure 6:
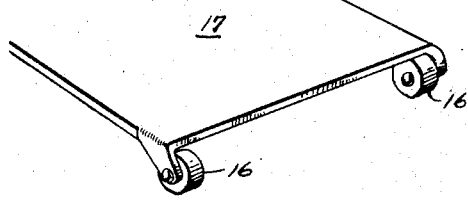
Fig. 6 is a fragmental end elevational view of a ramp, illustrating the rollers as mounted thereon.

As shown by Fig. 4 of the drawings, latch members are provided for engaging the arms 19' of the gates, when the gates swing downwardly, securing the gates in their open positions, temporarily. As shown, the latch members include tubular brackets 21 in which the latch arms 22 operate, the latch arms 22 having latch heads 23 formed with curved outer surfaces that engaged curved surfaces of the arms 19' causing the latch heads 23 to be moved rearwardly and snapped over the arms 19'.

The right angled ends 24 of the latch arms 22 are so disposed that they lie in the path of travel of the vehicle passing through the gate, and since the brackets 21 are slightly raised above the supporting surface, it will be seen that the right angled end 24 of the latch arm may swing downwardly a distance sufficient to rock the arm 22 and cause the latch head 23 to disengage the arm 19' associated therewith. When the latch head releases the gate, it is obvious that the gate will be swung to its normal vertical position by the coiled springs 20 as previously described.

Extending upwardly from one of the tubular brackets 21 of each pair of brackets that support the latch, is the arm 25 to which one end of the coiled spring 26 is connected, the opposite end of the coiled spring 26 being connected with the right angled end of the arm 22, at 27.

It might be further stated, that it is contemplated to use two of these gates on a road, each gate closing a traffic lane, and because of this arrangement, each gate will open in one direction only.

In view of the foregoing detailed disclosure, it is thought that further description as to the operation of the gate is unnecessary.

Having thus described the invention, what is claimed is:

A gate of the class described, comprising gate posts, a vertically swinging gate mounted between the posts, side panels providing runways forming a part of the gate, said panels having spaced longitudinal grooves providing tracks, formed in one side surface thereof, pivoted ramps disposed adjacent to the front of the gate, rollers mounted on the forward ends of the ramps, operating within the grooves formed in the runways, swinging the gate downwardly to its open position under the weight of a motor vehicle moving thereover, and means for returning the gate to its normal closed position.

WILLIAM BENKE.

REFERENCES CITED

The following references are of record in the file of this patent:

UNITED STATES PATENTS

| Number | Name | Date |
|---|---|---|
| 1,531,995 | Steece | Mar. 31, 1925 |
| 1,759,207 | Rose et al. | May 20, 1930 |
| 2,024,063 | Roper | Dec. 10, 1935 |
| 2,256,662 | Blaker | Sept. 23, 1941 |

FOREIGN PATENTS

| Number | Country | Date |
|---|---|---|
| 20,978/35 | Australia | Jan. 17, 1936 |
| 522,931 | Great Britain | July 5, 1939 |